United States Patent [19]

Eidt

[11] 3,910,979

[45] Oct. 7, 1975

[54] ORGANO HALOALUMINUM COMPOUNDS

[75] Inventor: Scott H. Eidt, Seabrook, Tex.

[73] Assignee: Stauffer Chemical Company, Westport, Conn.

[22] Filed: Jan. 31, 1974

[21] Appl. No.: 438,911

Related U.S. Application Data

[63] Continuation-in-part of Ser. No. 364,442, May 29, 1973, abandoned, which is a continuation-in-part of Ser. No. 166,974, July 28, 1971, abandoned.

[52] U.S. Cl. ...... 260/448 A; 252/431 R; 260/635 R; 260/680 R
[51] Int. Cl. ............................................... C07f 5/06
[58] Field of Search ............................... 260/448 A

[56] References Cited
UNITED STATES PATENTS

| | | | |
|---|---|---|---|
| 3,136,667 | 6/1964 | D'Alelio | 260/448 A |
| 3,180,837 | 4/1965 | Bruce et al. | 260/448 A |
| 3,375,235 | 3/1968 | D'Alelio | 260/448 A |
| 3,509,189 | 4/1970 | Ort et al. | 260/448 A |
| 3,509,190 | 4/1970 | Ort et al. | 260/448 A |
| 3,577,450 | 5/1971 | Ort et al. | 260/448 A |
| 3,651,112 | 3/1972 | Sinn et al. | 260/448 A |
| 3,700,710 | 10/1972 | Mottus et al. | 260/448 A |

OTHER PUBLICATIONS
Chem. Abstracts, Vol. 73, 76427x (1970).

Nesmeyanov et al., "Methods of Elemento Organic Chem." North Holland Publ. Co. Amsterdam Vol. 1, pp. 375–385 (1967).

*Primary Examiner*—Helen M. S. Sneed
*Attorney, Agent, or Firm*—Daniel C. Block

[57] ABSTRACT

Novel organoaluminum compounds having the formula:

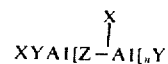

wherein Z is the ethylene, 2-butenylene or an alkyl-substituted 2-butenylene radical; Y is an alkyl or aryl radical; X is a halogen radical; and n is an integer of at least 1 and can range up to 20; are produced by reacting aluminum together with a suitable organic halide and either ethylene, 1,3-butadiene, or an alkyl-substituted 1,3-butadiene. These compounds have utility as co-catalysts for the polymerization of various organic compounds, and as intermediates for the preparation of various $\alpha, \omega$-disubstituted hydrocarbons.

14 Claims, No Drawings

ORGANO HALOALUMINUM COMPOUNDS

CROSS REFERENCE TO RELATED APPLICATION

This application is a continuation-in-part of copending application, Ser. No. 364,442 filed May 29, 1973 and now abandoned, which is a continuation-in-part of application, Ser. No. 166,974 filed July 28, 1971 and now abandoned.

BACKGROUND OF THE PRESENT INVENTION

Organic aluminum compounds are well known in the art. They have wide utility as co-catalysts in many polymerization and oligomerization systems. Several organodialuminum compounds are also known and have been produced by various methods. The $\alpha,\omega$-bis(dialkylaluminum)alkanes have been produced by reacting trialkylaluminum compounds with $\alpha,\omega$-dienes. Aluminum methylene compounds of the formula:

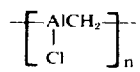

and bis(dichloroaluminum)methane have been produced by reacting aluminum with methylene chloride according to the method of Lehmkuhl and Schaefer, Tetrahedron Letters, 21, 2315 (1966).

In U.S. Pat. No. 3,516,978 is described the polymerization of ethylene in the presence of a catalyst which is prepared by the reaction of an aluminum-vanadium or an aluminum-manganese alloy with methylene bromide and methylene chloride.

It has now been discovered that novel organoaluminum compounds can be produced by reacting aluminum together with a suitable organic halide and an olefin. The compounds of the present invention are useful not only as co-catalysts in various olefin polymerization systems, but as intermediates in "growth reactions." The term "growth reaction" is meant to designate the reaction of the compounds of the present invention with an olefin such as ethylene under heat and pressure to yield long-chained dialuminum compounds, which in turn can be used to produce $\alpha,\omega$-dienes and $\alpha,\omega$-diol having known utility as plasticizers.

DETAILED DESCRIPTION OF THE INVENTION

The present invention relates to novel organodialuminum compounds and a method for preparing the same. In particular, the present invention relates to novel organoaluminum compounds having the formula:

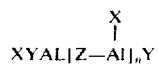

wherein Z is an olefin residue which is either an ethylene, a 2-butenylene or an alkyl substituted 2-butenylene radical; Y is an alkyl or aryl radical; X is a halogen radical from the group chlorine, bromine, and iodine; and n is an integer of at least 1 and can range up to 20. Thus, it is understood that the free Al bonds are occupied by the X and Y group outside the parentheses. The compounds of the present invention as depicted by the above formula, exist as an equilibrium mixture of two radical exchange forms as shown below:

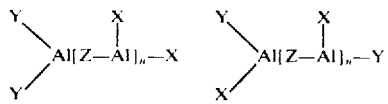

These compounds are produced by reacting aluminum with an organic halide and an olefin.

According to the process of the present invention, an organic halide and an olefin are reacted with metallic aluminum. The aluminum employed is active aluminum, meaning that it has unoxidized surfaces. It can be in the form of shavings, foil, flakes, or powder. Increased activity can be achieved by milling the aluminum in conventional grinding mills. However, caution must be employed when using finely divided aluminum metal since it reacts explosively with certain halides. It is preferable that the aluminum be relatively free of transition metals such as nickel, titanium, zirconium, vanadium, and the like since these metals form halides which catalyze the polymerization of the olefins.

The organic halides which can be employed to make the compounds of the present invention are those which would react with aluminum in the classical way to produce the corresponding sesquihalides. These include many of the primary lower alkyl and aryl halides of chlorine, bromine and iodine. The term lower alkyl is meant to designate an alkyl group having from 1 to about 4 carbon atoms. The term aryl is meant to designate phenyl and lower alkyl substituted phenyl. Illustrative of the halides which can be employed in the present invention are the following: methyl chloride, methyl bromide, methyl iodide, ethyl chloride, ethyl bromide, ethyl iodide, n-propyl bromide, n-propyl iodide, n-butyl iodide, chlorobenzene, bromobenzene, iodobenzene, p-chlorotoluene, and p-bromotoluene. The preferred halides for the present invention are the methyl and ethyl chlorides, bromides and iodides.

The olefins which can be employed in the present invention are ethylene, 1,3-butadiene and 2-alkyl- and 2,3-dialkyl-1,3-butadienes. The preferred olefins are ethylene, 1,3-butadiene, and isoprene, with ethylene and 1,3-butadiene being particularly preferred. If ethylene is the olefin used, the final product will contain the ethylenedialuminum structural unit; whereas if the starting material is a 1,3-butadiene, compounds containing the 1,4-dialumino-2-butene structure are produced. Thus, if ethylene is used as the olefin and ethyl chloride is the starting organic halide, the product will be an equilibrium mixture of compounds having the structures:

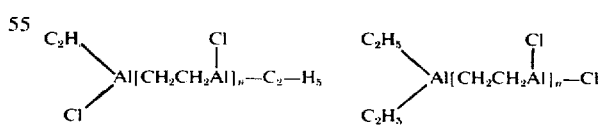

wherein $n$ is an integer of at least 1 and can range up to 20, preferably between 1 and 7, whereas if 1,3-butadiene is employed as the olefin and bromobenzene is used as the starting organic halide, the product will be an equilibrium mixture of compounds having the formulas:

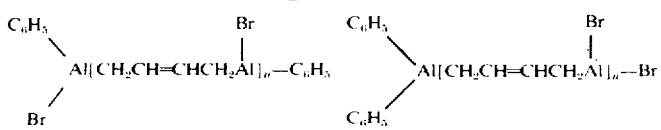

wherein *n* is an integer of at least 1 and can range up to 20, preferably between 1 and 7.

The process of the present invention can be accomplished with or without the use of a solvent. The solvent can be any inert organic or organometallic compound which will form a homogeneous liquid blend with the product under the reaction conditions. Saturated or aromatic hydrocarbons are acceptable solvents. Ethers or tertiary amines can be employed as solvents if the product is to be used in applications wherein the presence of a Lewis base is not detrimental. The Lewis bases form addition compounds with the organoaluminum compounds.

The olefin and halide of the present process are normally reacted in stoichiometric proportions, i.e., one mole of olefin per two moles of halide. However, these reactants can be used in a variety of molar ratios and the particular ratio is not critical. For most applications the olefin to halide molar ratio will be in the range of from 10:1 to 1:10. The ratio employed is governed by the relative reactivities of the halide and olefin, by the number of alkylenedialuminum units desired per molecule, and by the de-desired physical properties of the product. Although stoichiometric amounts of aluminum can be employed, it has been found preferable to use an excess of aluminum, since such excess can be used as a very reactive "heel" portion of aluminum for the next preparation. By using an excess of aluminum, a continuous reaction can be employed. Thus, the olefin and the halide can continually be charged into a reacting zone containing an excess of aluminum maintained at the desired temperature, and the desired product can be continually removed.

In the normal embodiment of the present invention, a mixture of the olefin and organic halide are added to a reactor containing activated aluminum. The temperature should be in the range from about 50° to about 170°C., preferably from about 60° to about 130°C. The reaction can be carried out over a wide range of pressures from 1–2000 atmospheres. In the preferred embodiment of the present invention, pressures from 1–20 atmospheres are employed.

An alkylaluminum sesquihalide can be added to the aluminum prior to addition of the halide in order to act as a slurry medium and activator for the aluminum. This sesquihalide also acts as a solvent for the compounds of the present invention and the resulting solution can be used as the co-catalyst without separation of the sesquihalide from the compounds of the present invention. Furthermore, some sesquihalide will formed in situ in the present invention. However, to further improve the processing properties of the compounds of the present invention, additional sesquihalide, an alkylaluminum halide, aluminum trialkyl or aluminum trihalide can be used. Since these materials are commonly used as catalyst components in Ziegler type systems, they are not deleterious to the catalytic properties of the compounds of the present invention. Thus, a further embodiment of the present invention are compositions containing an organoaluminum compound as described above in combination with an aluminum trialkyl, alkylaluminum halides and/or an aluminum trihalide. These aluminum trialkyls, alkylaluminum halides and aluminum trihalides are all well known in the art. They are mixed in an amount sufficient to give a mixture having the desired viscosity and solubility for the particular application for which the mixture is intended. This amount is readily determinable by those of ordinary skill in the art.

Although not essential to the present invention, it has been found to be advantageous to employ a second organic halide as a promoter for the reaction of the aluminum with the olefin and halide. Suitable promoters are those halides which contain halogen atoms having a higher atomic number than the halogen atom in the organic halide to be reacted. Thus when an alkyl chloride is to be reacted with aluminum and an olefin, suitable promoters are the alkyl bromides and alkyl iodides. Likewise, when an alkyl bromide is being reacted, suitable promoters will be the alkyl iodides. These promoters can be employed in any amount, but are normally used in the range from about 0.1 to about 10 percent by weight of the organic halide being reacted.

The compounds and process of the present invention will be further demonstrated by the following examples; however, it is not intended that the present invention be limited thereto.

EXAMPLE 1

A 1000 ml. flask fitted with a stirrer, thermometer, gas inlet and reflux condenser is purged with nitrogen and charged with 219 grams of dried aluminum powder. The aluminum is then slurried by adding 62 grams of methylaluminum sesquichloride, heating to 30°–50°C. and adding 10 grams of methyl iodide. The slurry is now heated to 90°–110°C. and 23 grams of methyl chloride are fed into the slurry via the gas inlet. The temperature is maintained between 90° and 110°C. while a mixture of 250 grams of methyl chloride and 70 grams of ethylene (in a 2:1 molar mixture) is fed beneath the surface of the slurry through the gas inlet over a period of about 5 hours. During the charging of the methyl chloride-ethylene mixture, 100 grams of methylcyclohexane are added to the mixture as a solvent. The mixture is next allowed to stand at 70°–90°C. for 4 hours and then cooled to ambient temperatures over a period of 8–12 hours. The clear, pale yellow liquid is then decanted off, leaving a residual slurry which can be used as a highly reactive "heel" for the next preparation, thereby reducing the amount of aluminum needed for that preparation.

All the products were identified by the following analytical method which is similar to the method used for determination of the composition of conventional organoaluminum compounds containing one aluminum atom per molecule. This method consisted of analysis of the mixtures of aluminum and halide ions and of hydrocarbons which were produced upon quantitative decomposition of the organoaluminum compounds with water or deuterium oxide. The organodialuminum compounds yield two different hydrocarbons upon decomposition with water; one of the hydrocarbons comes from the organoaluminum structure which has been produced by reaction of the organohalide with aluminum, and the other hydrocarbon comes from the organodialuminum structural unit derived from reaction of the olefin with aluminum. However, the product from the reaction of aluminum, ethylene, and an ethyl halide yields, upon decomposition with water, only one hydrocarbon, ethane. Upon decomposition with deuterium oxide ("heavy water") this product yields two different deuteroethanes, monodeuteroethane from deuterolyis of the ethylaluminum units and 1,2-dideuteroethane from the ethylenedialuminum structures. The relative amounts of the two different hydrocarbons are determined by gas chromatographic analysis or, in case of mixtures of mono- and dideuteroethane, by mass spectrographic analysis. In mixtures of alkylenedialuminum compounds and alkylaluminum sesquihalides the percentage of each is calculated from the atomic ratio of halide/aluminum and the relative amounts of the two hydrocarbons produced by deuterolysis. Calculation from the halide/aluminum ratio is possible because mixtures of alkylenedialuminum compounds (which have the halide/aluminum ratio = 1.0) and of alkylaluminum sesquihalides (which have the atomic ratio halide/aluminum = 1.5) exhibit ratios in the range of 1.0–1.5. Because the deuterolysis of alkylenedialuminum compounds yields a hydrocarbon which is not formed upon deuterolysis of alkylaluminum sesquihalides, the amount of this hydrocarbon in a deuterolysis mixture is proportional to the amount of the alkylenedialuminum compound in a mixture of the two types of organoaluminum compounds. As used hereinafter, the term % w designates weight percent of the entire product.

Analysis of the liquid product of Example 1 revealed: Al, 20.6% w; Cl, 28.8% w; and I, 2.4% w; for an atomic ratio of halide/aluminum = 1.31. The gaseous mixture obtained upon controlled hydrolysis consisted of 72.5 mole percent methane and 27.5 mole percent ethane. These analytical data showed the product to be a solution containing 57.7% by weight of a mixture of 1,2-bis(methylchloroalumino)ethane and 1-dimethylalumino-2-dichloraluminaoethane, 15.5% by weight of a mixture of methylaluminum sesquichloride and sesquiiodide, and 26.8% by weight of solvent. This composition corresponds to a 94% conversion of the ethylene-methyl chloride charge.

EXAMPLE 2

A vessel as in Example 1 is charged with 202 grams of dried aluminum flake. The aluminum is then slurried with 103 grams of dimethylaluminum bromide and the mixture is heated to 30°–50°C. while adding 8.5 grams of methyl iodide. A 2:1 molar mixture of methyl bromide and ethylene is charged into the flask below the surface of the slurry until a total of 475 grams of methyl bromide and 70 grams of ethylene have been added. This addition is made over a period of about four hours while maintaining the temperature in the range of 80° to 120°C. The mixture is then cooled as in Example 1. The product contained: Al, 19.7% w; Br, 58.2% w; and I, 1.1% w; for the atomic ratio of halide/aluminum = 1.01. The hydrolysis gas mixture consisted of 72.9 mole percent methane and 27.1 mole percent ethane. Calculations from these data indicate that 84.1% w of the product is a mixture of 1,2-bis(methylbromoalumino)ethane and 1-dimethylalumino-2-dibromoaluminoethane, 13.8% w dimethylaluminum bromide, and 2.1% w a mixture of methylaluminum dibromide and methylaluminum sesquiiodide.

EXAMPLE 3

To the aluminum, which has been charged into a vessel as in Example 1, is added 54.5 grams of ethylaluminum sesquichloride. While the slurry is stirred at 50°–80°C., 9.4 grams of ethyl iodide is added dropwise to the mixture. Then, in a 25 minute period, 38.7 grams of ethyl chloride is fed beneath the surface of the slurry which is at temperatures in the range of 80°–120°C. Entrained in the ethyl chloride is a portion of the 11.2 grams of ethyl bromide which had been placed in the surge flask in the ethyl chloride vapor stream. To the stirred mixture which is maintained at temperatures in the range of 80°–120°C., there is fed 320 grams of ethyl chloride and 70 grams of ethylene. A four to five hour period is required for charging the ethylene-ethyl chloride blend. At intervals of 1, 2 and 3 hours after starting the blend feed, there is injected 5.6 grams of ethyl bromide into the surge flask in the blend feed stream. Following the reaction step, the unagitated mixture is allowed to stand at 70°–80°C. for 4 hours and then to cool to ambient temperatures over a period of 8–12 hours. The clear, viscous liquid is siphoned away from the settled aluminum and transferred to a second container. The residual aluminum slurry serves as a "heel" for the next preparation. In the second and subsequent preparations, a 180-gram charge of aluminum is added and no ethyl iodide is used. Analysis of the liquid reveals: Al, 24,2% w; Cl, 33.4 % w; and an atomic ratio of halide/aluminum = 1.09. Controlled deuterolysis with deuterium oxide gives a mixture of 27.3 mole percent deuteroethane and 72.7 mole percent dideuteroethane. These data show the product to be 77.6% w a mixture of 1,2-bis(ethylchloroalumino)ethane and 1-diethylalumino-2-dichloroaluminoethane and 22.4% w ethylaluminum sesquihalides.

EXAMPLE 4

To a slurry of 176 grams of aluminum and 49.5 grams of ethylaluminum sesquichloride which is stirred at 50°–80°C. there is added 4.7 grams of ethyl iodide. Then, in a 25 minute period, 38.7 grams of ethyl chloride is fed beneath the surface of the slurry which is at temperatures in the range of 80°–120°C. Entrained in the ethyl chloride stream is a portion of the 4.1 grams of ethyl bromide which had been placed in the surge flask in the ethyl chloride vapor stream. To the stirred slurry which is maintained at temperatures in the range of 80°–120°C., there is fed 108 grams of butadiene and 356 grams of ethyl chloride. The blend is charged in a 4 hour period. Twice during this period, after 33% and 67% of blend has been fed, there is added 4.5 grams of ethyl bromide to the surge flask in the ethyl chloride feed stream. The reaction mixture is processed by the same procedure as that used in Example 1. The atomic ratio of halide/aluminum and the composition of the 2-butene-ethane mixture obtained upon hydrolysis of the product indicate that the material consists of 78.5% w a mixture of 1,4-bis(ethylchloroalumino)-2-butene and 1-diethylalumino-4-dichloroalumino-2-butene and 21.5% w ethylaluminum sesquihalides. Similar results are achieved when 136 grams of isoprene, i.e., 2-methyl-1, 3-butadiene, is substituted for the butadiene.

EXAMPLE 5

In like manner to Example 1, 553 grams chlorobenzene is substituted for the methyl chloride. The final product is a mixture of 1,2-bis(phenylchloroalumino) ethane and 1-diphenylalumino-2-dichloroaluminoethane.

EXAMPLE 6

To a 1 gallon, glass pressure reactor is added 313 g. of powdered aluminum slurried in 764 g. of ethylaluminum sesquichloride. The aluminum is reacted with 390 g. of ethyl chloride and 164 g. of ethylene at 90°C. and 30 psig pressure. The viscous liquid slurry obtained is filtered through a porous glass filter under $N_2$ pressure to remove the unreacted aluminum. The liquid composition is found to be: Al, 24.94% w; Cl, 35.13% w; and an atomic ratio of chloride/aluminum = 1.07.

To 2,000 ml. of dried hexane is added 151 g. of the filtered liquid. The hexane is vigorously agitated with a motordriven stirrer as the viscous liquid is added dropwise. A white, fluffy solid precipitates which is pressured transferred to a filter container. The solid is washed with four 150 ml. portions of fresh hexane, and the filter cake is dried by sweeping with $N_2$ while heating with a heat lamp. The dried solid weighs 33 g. and has the following composition: Al, 27.20% w; Cl, 37.15% w; and an atomic ratio of chloride/aluminum = 1.04. On hydrolysis of a portion of the solid with deuterium oxide, $D_2O$, the gas is analyzed by mass spectrometer and found to contain 22.2 mole% $C_2H_5D$ and 76.8 mole% $C_2H_4D_2$. The ratio indicates the ratio of ethylenedialuminum groups to ethylaluminum groups to be 3.45/1.

What is claimed is:

1. A composition of matter having the formula:

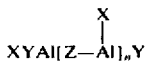

wherein Z is selected from the group consisting of ethylene, 2-butenylene and alkyl substituted 2-butenylene; Y is selected from the group consisting of alkyl and aryl; X is a halogen selected from the group consisting of chlorine, bromine and iodine; and n is an integer of at least 1 and can range up to 20.

2. The composition of claim 1 wherein Z is the ethylene radical.

3. The composition of claim 1 wherein Z is the 2-butenylene radical.

4. The composition of claim 1 wherein Z is the 2-methyl-2-butenylene radical.

5. The composition of claim 1 wherein Y is the methyl radical and X is the chlorine radical.

6. The composition of claim 1 wherein Y is the methyl radical and X is the bromine radical.

7. The composition of claim 1 wherein Y is the ethyl radical and X is the chlorine radical.

8. The composition of claim 1 wherein Y is the ethyl radical and X is the bromine radical.

9. The composition of claim 1 wherein Y is the phenyl radical and X is the chlorine radical.

10. The composition of claim 1 wherein Y is the phenyl radical and X is the bromine radical.

11. A process for the manufacture of organoaluminum compounds having the formula:

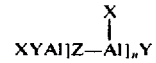

wherein Z is selected from the group consisting of ethylene, 2-butenylene and alkyl substituted 2-butenylene; Y is selected from the group consisting of alkyl and aryl; X is a halogen selected from the group consisting of chlorine, bromine, and iodine; n is an integer of at least 1 and can range up to 20, which comprises reacting an olefin selected from ethylene, 1,3-butadiene, 2-alkyl-1,3-butadiene and 2,3-dialkyl-1,3-butadiene and an organic halide selected from the group consisting of lower alkyl halides having from 1–4 carbon atoms and an aryl halide together with aluminum at temperatures in the range from about 50°C. to about 170°C.

12. The process of claim 11 wherein said reaction is conducted in the presence of a solvent.

13. A continuous process for the preparation of organo aluminum compounds having the formula:

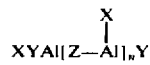

wherein Z is selected from the group consisting of ethylene, 2-butenylene and alkyl substituted 2-butenylene; Y is selected from the group consisting of alkyl and aryl; X is a halogen selected from the group consisting of chlorine, bromine and iodine, n is an integer of at least 1 and can range up to 20, which comprises continually charging an olefin selected from the group consisting of ethylene, 1,3-butadiene, 2-alkyl-1,3-butadiene and 2,3-dialkyl-1,3-butadiene and an organic halide selected from the group consisting of lower alkyl halides having from 1–4 carbon atoms and halo aryl into a reaction zone maintained in the temperature range from about 50°C. to about 170°C., said zone containing an excess of aluminum; and continuously removing the organoaluminum product.

14. The process of claim 11 wherein said reaction is conducted in the presence of a second organic halide as a promoter which contains a halogen atom having a higher atomic number than the halogen atom in the organic halide reactant.

* * * * *

UNITED STATES PATENT OFFICE
CERTIFICATE OF CORRECTION

PATENT NO. : 3,910,979
DATED : October 7, 1975
INVENTOR(S) : Scott H. Eidt

It is certified that error appears in the above-identified patent and that said Letters Patent are hereby corrected as shown below:

In the Abstract, that portion of the formula reading $$Z-\overset{X}{\underset{|}{Al}}[ \quad \text{should read} \quad Z-\overset{X}{\underset{|}{Al}}]$$

In Column 1, line 55, that portion of the formula reading AL should read Al.

In Column 2, line 56, that portion of the left hand formula reading $C_2H$ should read $C_2H_5$.

In Column 5, line 42, that portion of the line reading "dichloraluminaethane" should read ---dichloroaluminaoethane---.

The assignee should read as follows:

-- Assignee: Texas Alkyls, Inc.
Deer Park, Texas --.

Signed and Sealed this

First Day of March 1977

[SEAL]

Attest:

RUTH C. MASON
Attesting Officer

C. MARSHALL DANN
Commissioner of Patents and Trademarks